United States Patent
Fields et al.

(10) Patent No.: US 11,100,121 B1
(45) Date of Patent: *Aug. 24, 2021

(54) SYSTEMS AND METHODS FOR ELECTRONICALLY MINING INTELLECTUAL PROPERTY

(71) Applicant: STATE FARM MUTUAL AUTOMOBILE INSURANCE COMPANY, Bloomington, IL (US)

(72) Inventors: Brian Mark Fields, Normal, IL (US); Jufeng Peng, Avon, CT (US); Jason Freeck, Gurnee, IL (US); James Maxwell McWilliams, Rolling Meadows, IL (US); Mark O'Flaherty, Champaign, IL (US); Pat J. Johnson, Champaign, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/537,695

(22) Filed: Aug. 12, 2019

Related U.S. Application Data

(63) Continuation of application No. 15/861,848, filed on Jan. 4, 2018, now Pat. No. 10,445,331, which is a continuation of application No. 14/674,107, filed on Mar. 31, 2015, now Pat. No. 9,910,899.

(60) Provisional application No. 62/045,247, filed on Sep. 3, 2014.

(51) Int. Cl.
*G06F 16/2458* (2019.01)
*G06F 16/2457* (2019.01)

(52) U.S. Cl.
CPC .... *G06F 16/2465* (2019.01); *G06F 16/24578* (2019.01)

(58) Field of Classification Search
CPC .................................................. G06F 16/2465
See application file for complete search history.

(56) References Cited

U.S. PATENT DOCUMENTS

| | | | |
|---|---|---|---|
| 6,584,468 B1 * | 6/2003 | Gabriel | G06F 16/951 |
| 7,165,023 B2 | 1/2007 | Corman et al. | |
| 2010/0049708 A1 | 2/2010 | Kawai et al. | |
| 2010/0287478 A1 * | 11/2010 | Avasarala | G06F 16/358 |
| | | | 715/737 |

* cited by examiner

*Primary Examiner* — Van H Oberly
(74) *Attorney, Agent, or Firm* — Marshall, Gerstein & Borun LLP

(57) ABSTRACT

A method for electronically mining intellectual property using an associative discovery process may include determining a set of documents containing keywords and/or phrases associated with an industry trend of interest. The method may also include determining a feedback score for each document in the set, determining an optimal weighing scheme for the determined keywords and/or phrases using a statistical learning model and the feedback scores, ranking all documents in the set of documents according to the optimal weighing scheme, and providing results of the associative discovery process to a user.

20 Claims, 5 Drawing Sheets

SYSTEMS AND METHODS FOR ELECTRONICALLY MINING INTELLECTUAL PROPERTY

CROSS-REFERENCE TO RELATED APPLICATIONS

This application is a continuation of U.S. patent application Ser. No. 15/861,848, filed on Jan. 4, 2018 and entitled "Systems and Methods for Electronically Mining Intellectual Property," which is a continuation of U.S. patent application Ser. No. 14/674,107, filed on Mar. 31, 2015 and entitled "Systems and Methods for Electronically Mining Intellectual Property," which claims benefit of the filing date of U.S. Provisional patent Application 62/045,247, filed on Sep. 3, 2014 and entitled "Systems and Methods for Electronically Mining Intellectual Property." The entire disclosure of each of the above-identified applications is hereby incorporated by reference herein.

FIELD OF THE DISCLOSURE

The present disclosure generally relates to data mining and, more particularly, to systems and methods for electronically mining intellectual property for enterprise business needs.

BACKGROUND

Intellectual properties are recognized as valuable assets in many fields of business. As such, the ability to quickly harvest, discover, analyze and document intellectual properties has become a major goal for many companies and corporations.

However, many companies do not always have an enterprise view of the business processes and development works that are being planned or implemented. Consequently, many companies fail to properly discover potentially business-critical intellectual properties and/or new opportunities that may help them to innovate or solve their business problems.

Current methods of discovery rely mostly on managers and other responsible personnel to manually identify potential intellectual properties. For example, project managers may review and rate invention disclosures to determine their worth. However, such decisions are typically made in an ad-hoc manner and may be prone to the personal biases of the decision maker. Further, such decisions are often made without considering or valuing various existing enterprise business processes and interests.

SUMMARY

In one aspect, a computer-implemented method for electronically mining intellectual property using an associative discovery process includes: (1) determining, by one or more processors analyzing one or more enterprise documents in an enterprise dataset associated with a business entity, a set of documents containing one or more keywords and/or phrases associated with an industry trend of interest; (2) determining, by one or more processors, a feedback score for each document in the set of documents, wherein the feedback score for a given document indicates relevance of the given document to the industry trend of interest; (3) determining, by one or more processors, an optimal weighing scheme for the determined one or more keywords and/or phrases using a statistical learning model and the feedback scores for the set of documents, wherein determining an optimal weighing scheme includes calculating an optimal weight for each of the determined one or more keywords and/or phrases; (4) ranking, by one or more processors, all documents in the set of documents according to the optimal weighing scheme, such that the ranking indicates how strongly each document in the set of documents is related to the industry trend of interest; and/or (5) providing, by one or more processors, results of the associative discovery process to a user.

In another aspect, a non-transitory computer-readable storage memory includes computer-readable instructions to be executed on one or more processors of a system for electronically mining intellectual property using an associative discovery process. The instructions when executed cause the one or more processors to: (1) determine, by analyzing one or more enterprise documents in an enterprise dataset associated with a business entity, a set of documents containing one or more keywords and/or phrases associated with an industry trend of interest; (2) determine a feedback score for each document in the set of documents, wherein the feedback score for a given document indicates relevance of the given document to the industry trend of interest; (3) determine an optimal weighing scheme for the determined one or more keywords and/or phrases using a statistical learning model and the feedback scores for the set of documents, wherein determining an optimal weighing scheme includes calculating an optimal weight for each of the determined one or more keywords and/or phrases; (4) rank all documents in the set of documents according to the optimal weighing scheme, such that the ranking indicates how strongly each document in the set of documents is related to the industry trend of interest; and/or (5) provide results of the associative discovery process to a user.

In another aspect, a computer system for electronically mining intellectual property using an associative discovery process includes one or more dataset repositories and an analysis server. The analysis server includes a memory having instructions for execution on one or more processors. The instructions, when executed by the one or more processors, cause the analysis server to: (1) determine, by analyzing one or more enterprise documents in an enterprise dataset associated with a business entity, a set of documents containing one or more keywords and/or phrases associated with an industry trend of interest; (2) determine a feedback score for each document in the set of documents, wherein the feedback score for a given document indicates relevance of the given document to the industry trend of interest; (3) determine an optimal weighing scheme for the determined one or more keywords and/or phrases using a statistical learning model and the feedback scores for the set of documents, wherein determining an optimal weighing scheme includes calculating an optimal weight for each of the determined one or more keywords and/or phrases; (4) rank all documents in the set of documents according to the optimal weighing scheme, such that the ranking indicates how strongly each document in the set of documents is related to the industry trend of interest; and/or (5) provide results of the associative discovery process to a user.

Advantages will become more apparent to those skilled in the art from the following description of the preferred embodiments which have been shown and described by way of illustration. As will be realized, the present embodiments may be capable of other and different embodiments, and their details are capable of modification in various respects.

Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the present embodiments are not limited to the precise arrangements and instrumentalities shown, wherein.

Figure 1:
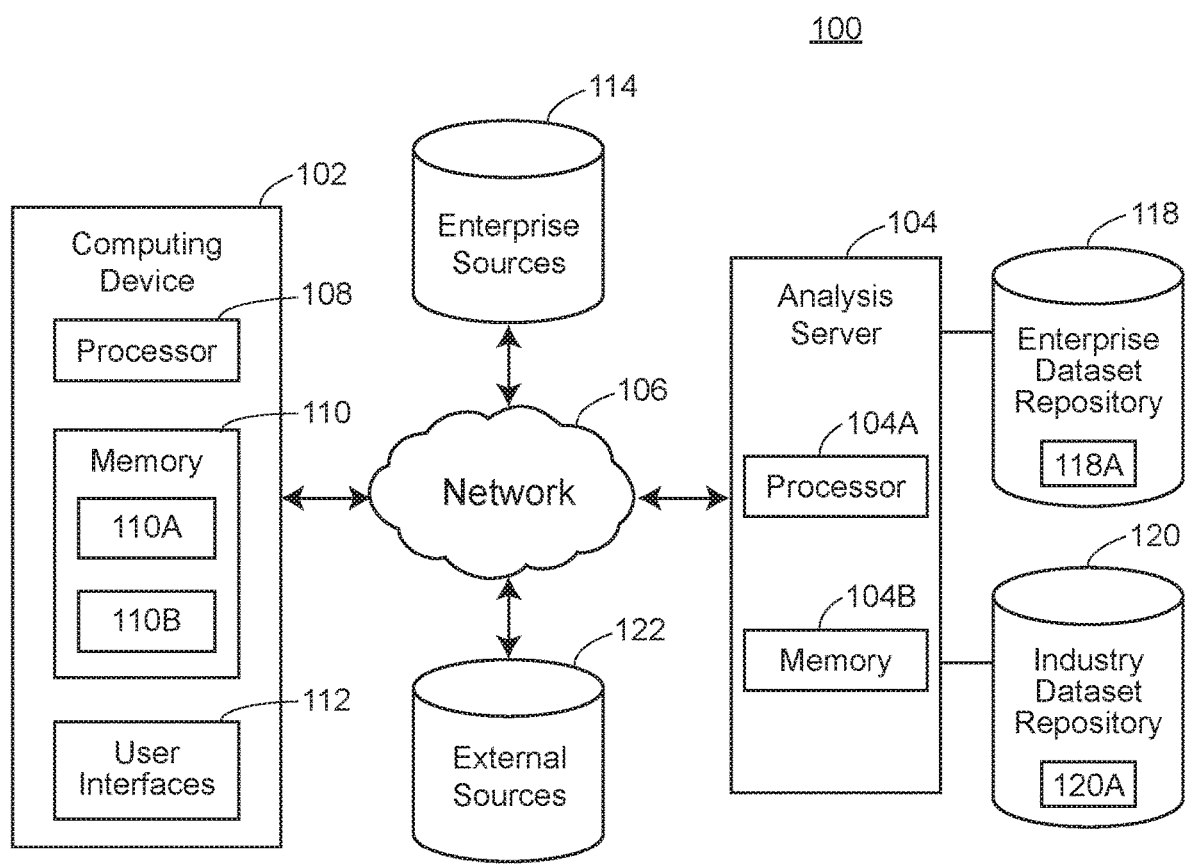
FIG. 1 is a block diagram of an exemplary system for electronically mining intellectual property for enterprise business needs.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The systems and methods disclosed herein may generally relate to, inter alia, using data mining techniques to electronically mine potential intellectual property. To do so, existing enterprise documents or data may be harvested and analyzed with respect to the latest industry trends, or areas of high interest or opportunity. More particularly, the existing enterprise data may be associated with new business processes and/or new technologies in ways that foster the creation of new or potential intellectual property. In this manner, innovative business solutions may be quickly identified and evaluated for various enterprise business needs.

In one aspect, the present embodiments may relate to (1) area of interest identification (such as via a processor); (2) electronically searching a database and/or documents (e.g., data mining) based upon the area of interest identified; and/or (3) electronically identifying the documents located from the search/data mining that are the most relevant to the area of interest.

The area of interest identification may include electronically searching and/or analyzing various websites, online newsfeeds, radio broadcasts, television programs, technology or business journals or magazines, and/or other sources of information and reports. The area of interest identification may reveal certain industry trends or opportunities, each of which may be characterized by one or more "identifiers."

Identifiers may include, for example, (1) keywords, and/or (2) keyword linking terms, i.e., terms that may be associated with a certain keyword or that may interconnect two or more keywords (e.g., a key phrase). As an example, for the keyword "payment," a linking term may be "mobile" or "online." The identifiers, in one embodiment, may indicate industry trends, technology trends, business processes, or the like.

After the area of interest identification is performed, data mining may commence. For example, after one or more identifiers associated with an area of interest are identified, a database of documents, power points, presentations, flow charts, business plans, and/or other documents may be searched and/or analyzed by a processor using the identifiers. The database may be a company specific database or databases, such as a company's internal document repositories, emails, business plans, and/or other documents. After documents are searched based upon the identifier(s), the documents flagged as being of potential interest may be ranked by the perceived most relevant to the keyword, keywords, area of interest, and/or subject matter searched for.

Each document may also have an author indicated. The author may be the most knowledgeable person about a particular topic, trend, technology, and/or business project within a company. Alternatively, the author may know who within a company or department is a subject matter "expert." The subject matter expert may additionally or alternatively be the person who may be contacted for further information regarding the topic, trend, technology, project, and/or business area.

In one embodiment, a computer-implemented method of identifying documents relevant to a particular topic may be provided. The method may include: (1) using a processor to identify one or more keywords (and/or link or linking terms) associated with industry trends; and (2) then electronically searching documents based upon the keyword or keywords (and/or link or linking terms) identified. The linking terms may be associated with a group of related terms, and/or relate to a relationship among or between words. The linking terms may also be acronyms that may be used to replace certain keywords and then to search for documents of interest. The linking terms may be used to identify and summarize potentially new word associations, such as "Near Field Communication Mobile Payment." As a result, documents containing innovative concepts that may provide a business advantage may be automatically identified and flagged for further automated and/or manual analysis.

In one embodiment, a computer-implemented method may include: (1) gathering documents from specific enterprise development sites; (2) assessing the content of those documents for ideas and concepts that may be patentable; and/or (3) using a predictive model to select the documents that are most likely to contain ideas and concepts that may be patentable. The selected documents may then be rank ordered according to a likelihood that they contain ideas and concepts that may be patentable, and then forwarded to appropriate personnel for review.

Target documents may be used to train the predictive model. The target documents may be known to contain ideas and concepts that may be patentable. The target documents may be used to identify candidate topics: (a) words; (b) phrases; (c) combinations of words and/or phrases; (d) words and/or phrases near other words and/or phrases; and/or (e) words in a certain order. The candidate topics may be used to build a taxonomy (i.e., an organized grouping of candidate topics, such as important words and/or phrases). Target documents or other documents may be scored against the taxonomy.

In another embodiment, a method for identifying patentable subject matter may be provided. The method may include (1) identifying important document sources; (2) identifying document types to consider (e.g., project charters, business requirements, use cases, etc.); (3) developing automated search and retrieval methods for document sources; (4) developing a taxonomy; and/or (5) developing a predictive modeling approach for assessing the documents for patentable content. The method may include additional, fewer, or alternate actions, including those discussed elsewhere herein.

I. Associative Discovery

In one aspect, a computer-implemented associative discovery process or method may be provided. The associative discovery process may include associating the latest industry technology trends to enterprise business processes to inspire new insights and stimulate creative discovery of innovative business solutions. The method may include automatically analyzing, via a processor, two or more types of input.

A first input may be used to identify the latest industry technology and/or business trends. The first input may include documents of a general nature and/or publicly available information, such as documents created by third-parties. More specifically, the first input or type of documents analyzed may include information or data related to the latest industry technology, business trends, processes, companies, startups, and/or other documents pertaining to an industry, such as patents; reports; business or technical journals; websites; emails; technical or industry reports (such as daily, monthly, or quarterly reports); and/or other documents. The first input may include documents available on the internet, in public or university libraries, government reports or studies, and/or otherwise be in the public domain. The first input may be primarily or entirely publicly available documents and information.

A second input may be searched or mined for intellectual property, and/or used to identify enterprise (i.e., primarily internal business or company) documents related to the latest industry technology and/or business trends. The second input may include enterprise project documents, such as electronic or hardcopy documents. The enterprise project documents may detail various projects being proposed, undertaken, and/or completed by the enterprise. The enterprise project documents may include project numbers; project titles, names, and/or code words; author or team member names; business documents; project plans; strategic or business plans and/or goals; emails; power points; flow charts; screen shots; design documents; website design documents; and/or other business documents. The second input may be primarily or entirely non-public information and/or company confidential, and/or otherwise internal documents and information.

In one embodiment, the first input may identify or yield a search term or terms related to a certain areas of interest, such as "telematics" or "auto insurance." The first input may be primarily publicly available documents related to industry technology or business trends. After which, the search terms may facilitate electronically analyzing the second input (i.e., an internal database or repository of documents, that may include primarily internal business documents), such as via a processor, to provide initial analysis, suggestions, and/or recommendations.

After which, the associative discovery process may (1) identify, link, associate, and/or discover company-related projects, processes, and/or authors of documents using the search terms. The associative discovery process may also (2) create visual results, such as reports, charts, and data visuals, to assist or enhance the associative discovery process, and/or (3) compare and/or contrast the visual results to historical reports and/or data.

The associative discovery process may further include applying one or more business applications. The business applications may include (1) integrating process owners with common business processes and/or creating new business social networks around newly discovered associations, including search or linking term associations and relationships to areas of interest. The business applications may further include (2) conducting targeted ideation with the identified knowledge assets to create innovative business solutions using the latest industry technologies and trends; and/or discovering innovative business solutions with the new associations and/or relationships identified by the associative discovery process.

In general, companies or corporations may also use the associative discovery process to internally go through and identify how their efforts and resources are distributed between different business projects and processes.

II. Intellectual Property Harvesting

The present embodiments may relate to electronically harvesting various types of enterprise or company documents that may potentially describe intellectual property through the use of text mining tools and/or other data analysis tools, which may be referred to as electronically mining intellectual property. The present embodiments may use custom algorithms and software to combine data from the latest industry technology with enterprise or company data to enable a concept called "associative discovery" herein. Associative discovery may associate seemingly unrelated data and processes in new ways and enable discovery of new business processes with integration points of new technologies. The present embodiments may identify and/or suggest potential new business solutions.

New technology and business processes may be generated and explored across all areas of a company on a daily basis. The present embodiments may include an agile process that quickly harvests, discovers, analyzes, and/or documents intellectual property for future business processes and interests.

Electronic mining of intellectual property, as disclosed by the present embodiments, may include (a) electronically harvesting enterprise or company documents; (b) organizing, filtering, sorting, and/or showing or visually depicting data relationships (including relationships between individual documents and keywords, search terms, and/or areas of interest); and/or (c) enabling processor or human analysis and/or discovery of the intellectual property identified, and/or the documenting thereof.

The present embodiments may involve automatically compensating for misspelled words in documents, and/or finding correlations among words or link terms. The link terms may be a group of related terms, such as "computer" and "mouse." The link terms may facilitate analyzing a relationship between words within a document. The link terms may also include acronyms that may be used as replacement search terms for the link terms.

Visual reports or summaries may be generated, such as by keyword or keywords. The visual reports may enhance the communication among different working groups or teams working on similar types of things and/or projects. The visual reports may also identify and/or list authors of certain key documents to facilitate determining who within an enterprise are the subject matter experts for a given area.

III. Keywords

In one aspect, a method may include identifying industry trends. Once identified, keywords may be determined from or associated with the industry trends. In turn, the keywords may then be used to search company-specific internal documents to identify innovation that may provide a business advantage.

The present embodiments may involve keyword extraction from each document analyzed electronically. Each document may be compared with other documents on the basis of an aggregate amount of keywords that each document contains. The documents may also be compared as to the relevance of the keywords that they contain, such as primary or secondary keywords. The documents may be ranked with respect to each other on the basis of the relevance (to an area of interest) of the keywords that each document contains.

For example, primary keywords for a business plan or trend may include "electronic payment." The secondary keywords for the business plan or trend may include "funds transfer." Documents searched that include the primary keywords or search terms may be ranked higher than documents that include the secondary keywords or search terms. Additionally or alternatively, documents containing both primary and secondary keywords and/or search terms may be ranked higher than documents with only the primary keywords or search terms.

Keyword extraction may include identifying link terms that may connect one or more keywords. For instance, a link term for the keywords "electronic" and "payment" may include "mobile," i.e., "electronic mobile payment" being used in a sentence. Another exemplary link term for the keywords "funds" and "transfer" may include "bank," such as a sentence reading "Funds may be deposited via bank transfer." The link terms may link two or more keywords directly or indirectly. The link terms may also be analyzed for their proximity or closeness to one or more keywords.

IV. Exemplary System for Electronically Mining Intellectual Property

FIG. 1 depicts an exemplary system 100 for electronically mining intellectual property for enterprise business needs. The exemplary system 100 includes a computing device 102 coupled to an analysis server 104 via a communication network 106 that may include wired and/or wireless links. The computing device 102 may be, for example, a laptop computer, a desktop computer, a tablet computer, a smart phone, or other computing devices capable of sending and receiving data over the network 106. As shown in FIG. 1, the computing device 102 may include a processor 108, a memory 110, and user interfaces 112 (e.g., a display screen, a touchscreen, a keyboard, etc.). Moreover, while only one computing device 102 is shown in FIG. 1, the system 100 may include any number of computing devices in other embodiments and/or scenarios.

Generally speaking, a user may use the computing device 102 to communicate with the analysis server 104 to perform analysis on various enterprise documents in order to discover new or potential intellectual property. A given enterprise document represents data that describes an enterprise business process, application, project or other business interest that is being explored, developed, marketed, serviced or maintained by a business entity such as a company or corporation. For example, the enterprise document may be a technical paper, an annual report, an invention disclosure, a project charter, a press release, a use case report, and the like. Further, the enterprise document may be generated in any electronic format such as a word processing format, a spreadsheet format, a slide presentation format, a Portable Document Format (PDF), an e-mail, a web page, an image format (e.g., JPEG, TIFF, bitmap, etc.), etc.

The user may obtain the various enterprise documents by accessing one or more enterprise sources 114 (such as enterprise databases, project files, sharepoints, etc.), which may be owned, operated or controlled by the company or corporation. The enterprise sources 114 may store hundreds if not thousands of individual documents. Once obtained, the various enterprise documents may be sent to the server 104 for analysis. In some embodiments, the obtained enterprise documents may be stored in the memory 110 as enterprise data 110A before being transmitted to the server 104 via the network 106. In other embodiments, the obtained enterprise documents may be sent directly to the server 104 via the network 106.

The analysis server 104 may be a single server or a plurality of servers with distributed processing. The server 104 may be directly coupled to an enterprise dataset repository 118 and an industry dataset repository 120. In some embodiments, the repository 118 and/or the repository 120 may not be directly coupled to the server 104, but instead may be accessible by the server 104 via a communication network such as the network 106.

The analysis server 104 may receive enterprise documents or data via the network 106 and store the received data in the repository 118 as enterprise dataset 118A. In one embodiment, the server 104 receives the enterprise data 110A in the memory 110 via the network 106, and stores the received enterprise data 110A as the enterprise dataset 118A. The server 104 may operate directly on the enterprise dataset 118A, or may operate on other data that is generated based on the enterprise dataset 118A. For example, the server 104 may modify or configure the dataset 118A (such as for efficient storage), and later utilize the modified dataset for analysis purposes.

The analysis server 104 may also receive industry data via the network 106 and store the received data in the repository 120 as industry dataset 120A. The industry data relates to the latest industry trends (such as business processes or technologies) that are relevant to the field in which the company or corporation operates. The industry data may be in the form of industry reports, company reports, technical journals, market studies, newspaper articles, interviews, etc. In some embodiments, the server 104 may receive the industry data directly from one or more external sources 122. In other embodiments, the server 104 may receive the industry data from a user (e.g., via the computing device 102). In this scenario, the user may gather various industry data and store the data in the memory 110 as industry data 110B. The user may then transmit the industry data 110B to the server 104 via the network 106.

The one or more external sources 122 may include a variety of publicly accessible data sources such as Internet websites, blogs, news feeds, podcasts, online forums, audio/video sharing sites, social media networks, and the like. In some embodiments, the analysis server 104 and/or the computing device 102 may be configured to gather industry data from the external sources 122 at regular intervals (such as at various times throughout each day, week, month, etc.). In other embodiments, data may be automatically requested and sent from the external sources 122 to the server 104 and/or the device 102 through the use of a data refresh executable or script. In this manner, the industry dataset 120A in the repository 120 and/or the industry data 110B in the memory 110 may be continuously refreshed as the external sources 122 are updated with new information.

In order to discover new or potential intellectual property, the server 104 may be configured to perform associative discovery. In this process, various enterprise data along with the latest industry trends are correlated in an effort to identify or create innovative enterprise business solutions. To accomplish this, a processor 104A of the server 104 may execute instructions stored in a memory 104B of the server 104 to first retrieve the datasets 118A and 120A in the enterprise dataset repository 118 and the industry dataset repository 120, respectively. The server 104 may then analyze the datasets 118A and 120A to determine data relationships, correlations, associations or other meaningful connectivity between the datasets that may lead to the generation of new or potential intellectual property.

In some embodiments, the computing device 102 may be configured to perform the associative discovery process. In this scenario, the processor 108 may execute instructions stored in the memory 110 to analyze the data 110A and 110B in order to discover new or potential intellectual property.

V. Exemplary Process for Electronically Mining Intellectual Property

Figure 2:
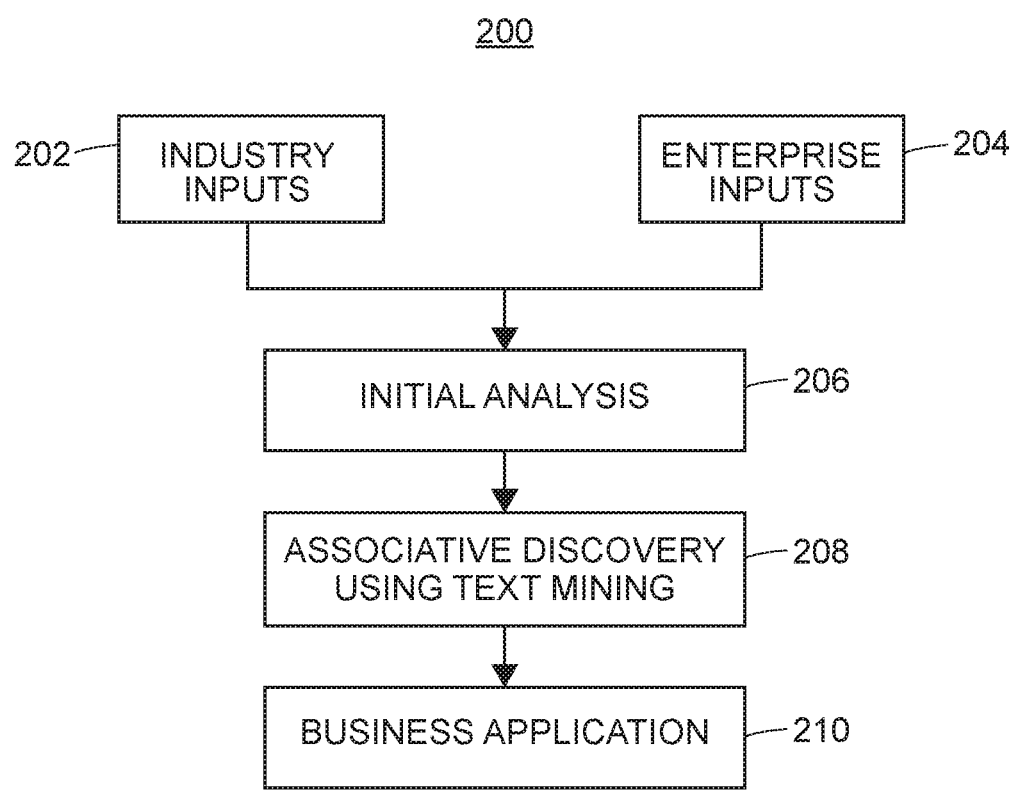
FIG. 2 is a flow diagram of an exemplary process for electronically mining intellectual property.

FIG. 2 depicts a flow diagram of an exemplary process 200 for electronically mining intellectual property for enterprise business needs. Generally speaking, the process 200 operates by associating enterprise documents and data with the latest industry trends in order to inspire new insights and stimulate the discovery of new or potential intellectual property.

To begin, the process 200 acquires industry inputs (block 202) and enterprise inputs (block 204). The industry inputs may include information that describes the latest industry trends such as the latest industry technologies, business methods, company profiles, etc. The enterprise inputs may include information that describes various enterprise business processes, products, applications, projects or other business interests that are being generated or explored by a company or corporation. In an embodiment, the industry inputs may be in the form of technology reports, and the enterprise inputs may be in the form of enterprise documents that are gathered or received by the process 200 on a regular basis (e.g., daily, weekly, etc.).

Next, the process 200 proceeds to perform initial analysis on the acquired industry and enterprise inputs (block 206). Here, the process 200 may organize, sort, filter or otherwise compile the industry and enterprise inputs for subsequent processing.

The process 200 then performs associative discovery by using data mining, such as text mining, on the compiled industry and enterprise inputs (block 208). For example, the process 200 may use text mining to associate various enterprise business processes, projects, process owners to the latest industry technologies and business methods. In doing so, the process 200 may uncover meaningful relationships or connections that may lead to the discovery of new or potential intellectual property. As part of the associative discovery process, the process 200 may also generate reports, charts and other data visuals to enable or assist in further human analysis and evaluation. Additionally, the process 200 may compare and contrast generated historical reports so that important trends or patterns in the development of new or potential intellectual property may be identified and learned.

Based upon the results of the associative discovery process, the process 200 may suggest or recommend business applications (block 210). For example, based on knowledge gained from the associative discovery process, the process 200 may suggest the creation of an innovative business solution that uses the latest industry technology in an effort to generate new or potential intellectual property. As another example, through newly discovered associations obtained from the associative discovery process, the process 200 may recommend the creation of a new business social network by bringing together various process owners so that the process owners may interact with one another in an effort to brainstorm new ideas and solutions.

VI. Exemplary Method for Electronically Mining Intellectual Property

Figure 3:
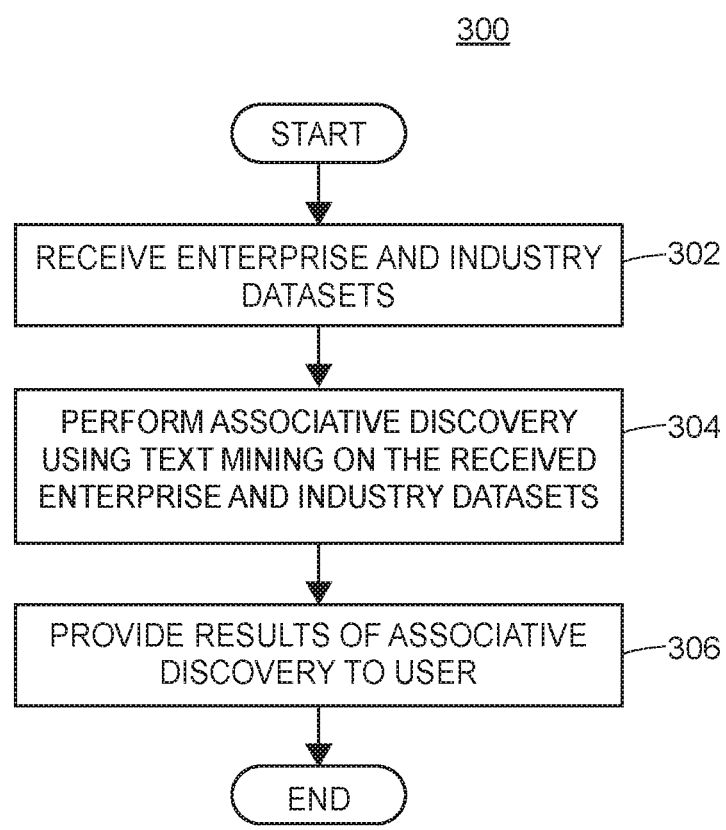
FIG. 3 is a flow diagram of an exemplary method for electronically mining intellectual property for enterprise business needs.

FIG. 3 depicts a flow diagram of an exemplary method 300 for electronically mining intellectual property for enterprise business needs. The method 300 may include one or more blocks, routines or functions in the form of computer executable instructions that are stored in a tangible computer-readable memory (e.g., 104B, 110 of FIG. 1) and executed using a processor (e.g., 104A, 108 of FIG. 1). Generally speaking, the method 300 may be implemented to carry out the process 200 of FIG. 2, in which industry and enterprise inputs are correlated to promote the discovery of new or potential intellectual property.

The method 300 begins by receiving enterprise and industry datasets (block 302). For example, with reference to FIG. 1, the method 300 may receive the enterprise dataset 118A and the industry dataset 120A. The enterprise dataset may comprise data that specify various enterprise business processes, applications, projects or other business interests that are being generated or explored by a company or corporation. The industry dataset may comprise data that specify the latest industry trends that are relevant to field in which the company or corporation operates. In some embodiments, the enterprise and industry datasets may be received as formatted data ready for use in subsequent steps. In other embodiments, the enterprise and industry datasets may be received as raw data, and the method 300 may convert the raw data into any desired format, protocol, or information type needed for subsequent processing. In some embodiments, the method 300 may receive the enterprise dataset and up to one or more industry datasets.

Next, the method 300 performs associative discovery by using data mining, such as text mining, on the received enterprise and industry datasets (block 304). Here, the method 300 may identify an emerging technology that has been developed by examining the industry dataset. The method 300 may then analyze the enterprise dataset in the context of the emerging technology. In particular, the method 300 may use text mining to sort, filter, associate and summarize information specified in the enterprise dataset (e.g., enterprise documentations, projects, applications, topics, etc.) according to the designs and requirements of the emerging technology. For example, the method 300 may discover a novel application involving the emerging technology, which in turn may lead to the creation of new or potential intellectual property.

The method 300 may perform the associative discovery process by using any number of text mining techniques or tools. For example, the method 300 may utilize commercially available text mining tools such as PolyAnalyst from Megaputer. Alternatively or additionally, the method 300 may employ proprietary algorithms that support text or data mining functions. The use of text mining techniques to perform associative discovery is described in more detail in connection with FIG. 4.

The method 300 then proceeds to provide the results of the associative discovery process a user (block 306). The method 300 may generate various reports and charts to assist the user in understanding the newly discovered intellectual property. For example, the method 300 may generate a report that summarizes all the relevant documents in the enterprise dataset that were discovered as part of the associative discovery process. Once generated, the method 300 may display the various reports to the user (e.g., via the user interfaces 112 of FIG. 1).

VII. Exemplary Method for Using Text Mining to Perform Associative Discovery

Figure 4:
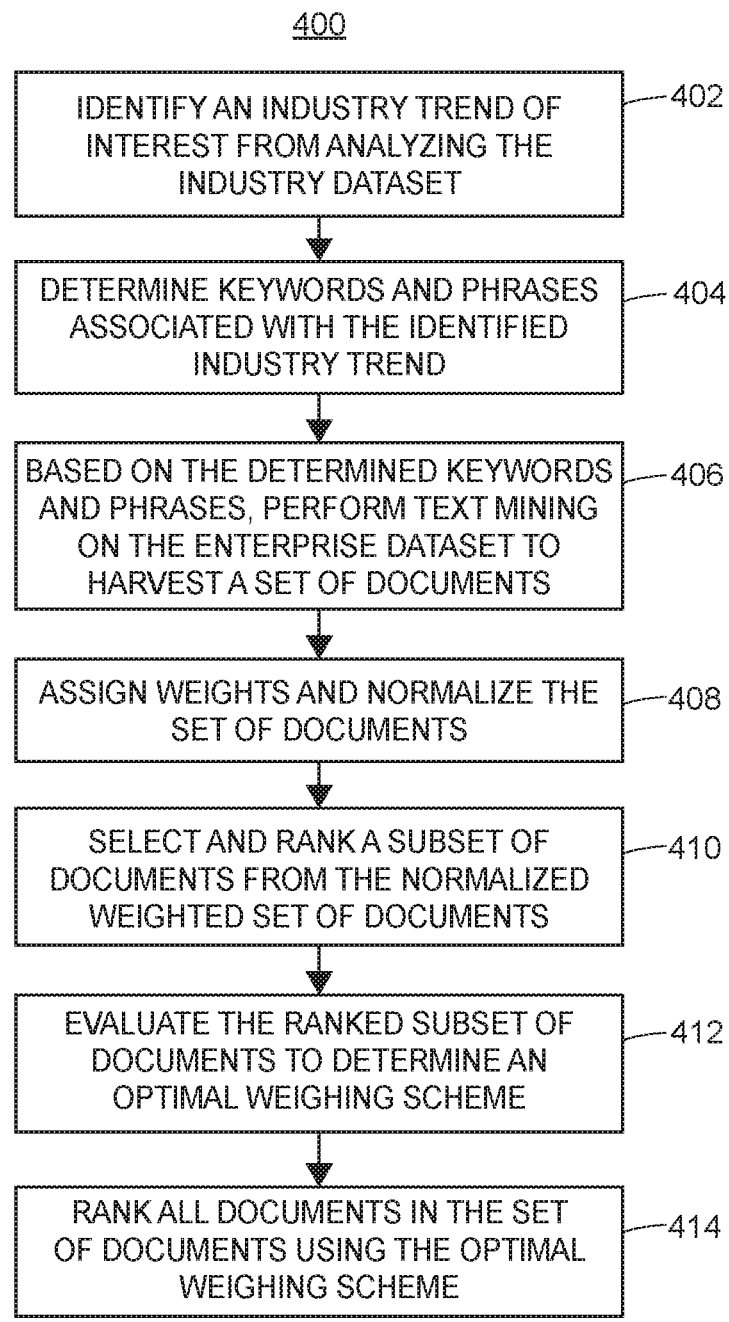
FIG. 4 is a flow diagram of an exemplary method for using text mining to perform associative discovery.

FIG. 4 depicts a flow diagram of an exemplary method 400 for using text mining to perform associative discovery.

The method 400 may be implemented as part of the block 304 in FIG. 3. As such, FIG. 4 will be described with reference to FIG. 3. Similar to the method 300, the method 400 may include one or more blocks, routines or functions in the form of computer executable instructions that are stored in a tangible computer-readable memory (e.g., 104B, 110 of FIG. 1) and executed using a processor (e.g., 104A, 108 of FIG. 1).

The method 400 may begin by identifying an industry trend that is of interest to a company or corporation from analyzing the industry dataset (block 402). For example, the industry dataset may specify a new business process or the latest technology that the company or corporation is interested in exploring or protecting.

The method 400 may then proceed to determine keywords and phrases associated with the identified industry trend (block 404). These keywords and phrases may describe the requirements, designs or other information related to the identified industry trend. For example, the identified industry trend may specify the latest technology in the field that the company or corporation operates. Accordingly, the industry dataset may include a market study that explains the development of the latest technology. The method 400 may then examine the market study and select certain terms, names, or expressions in the market study for use as the keywords and phrases.

Based on the determined keywords and phrases, the method 400 may perform text mining on the enterprise dataset to harvest a set of documents (block 406). Specifically, the method 400 may associate all enterprise documents or data in the enterprise dataset with the determined keywords and phrases (or fragments of keywords and phrases) with the goal of discovering any current, previous and/or future work that may be used for generating new or potential intellectual property. For example, the method 400 may use various text mining techniques (such as entity extraction, keyword extraction, word matching, spell check and correction, word clustering, N-gram analysis, context searching, etc.) to find one or more documents in the enterprise dataset that may be correlated with the determined keywords and phrases. Moreover, the method 400 may perform a taxonomy, which entails organizing groupings of words, phrases and concepts used to extract meaning from the one or more documents in the enterprise dataset.

The method 400 may also assign weights and normalize the harvested set of documents (block 408). For example, a weight may be assigned to a document, certain keywords and phrases or a combination thereof. Assigning a weight to a document may be based on the number of times that the determined keywords and phrases appear in the document. As such, more weight may be given to a document if the determined keywords and phrases appear more frequently. Further, as different documents have different lengths and formats, the method 400 may normalize the weighted set of documents for consistency purposes.

The method 400 may then proceed to select and rank a subset of the normalized weighted set of documents (block 410). The number of documents in the selected subset may be smaller than the harvested set of documents. The selected subset of documents may also be ranked in terms of the normalized weight, with the document having the greatest normalized weight ranked first and the document having the lowest normalized weight ranked last. The ranking may serve as an order for the method 400 to evaluate the documents for the possibility of generating new or potential intellectual property.

Next, the method 400 may evaluate the ranked subset of normalized weighted documents to determine an optimal weighing scheme (block 412). In particular, the method 400 may first analyze each document in the ranked subset to ascertain how relevant each document is to the identified industry trend. For example, the method 400 may compare or examine the content of each document with respect to the identified industry trend. In some embodiments, the method 400 may provide the ranked subset to a user for evaluation. For instance, the method 400 may display the ranked subset of documents to the user on a display screen (e.g., via the user interfaces 112 of FIG. 1). In any event, the method 400 may provide feedback on the relevance of each document in the ranked subset after the evaluation. The feedback may be provided in the form of a feedback score, for example. In some embodiments, the feedback sore may be generated based on identified words and phrases associated with business decisions made by the company or corporation. Based on the feedback score, the method 400 may then determine the optimal weighing scheme. As an example, the method 400 may use a statistical learning model to calculate an optimal weight for each of the determined keywords and phrases with the feedback score as the target.

Finally, by using the optimal weighing scheme, the method 400 may rank all documents in the harvested set of documents (block 414). This ranking may serve to indicate the strength of the relationship between each document in the set and the identified industry trend. In other words, the ranking may be used to determine the likelihood that a given document in the set may be used to generate or form the basis of a new or potential intellectual property. The method may include additional, fewer, or alternate actions, including those discussed elsewhere herein.

VIII. Exemplary Method

In one aspect, a computer-implemented method for electronically mining intellectual property may be provided. The method may include (1) receiving, by one or more processors, an enterprise dataset, the enterprise dataset including one or more enterprise documents from a business entity; (2) receiving, by one or more processors, up to one or more industry datasets, the up to one or more industry datasets including one or more technology trends that are relevant to the field in which the business entity operates; (3) identifying, by one or more processors, an industry trend of interest from the up to one or more industry datasets; (4) performing, by one or more processors, an associative discovery process by using text mining to analyze the one or more enterprise documents in the enterprise dataset and the identified industry trend of interest in order to determine correlations that may lead to the generation of a potential intellectual property; and/or (5) providing, by one or more processors, results of the associative discovery process to a user. The method may include presenting the results on a display of a computing device or mobile device. The method may include additional, fewer, or alternate actions, including those discussed elsewhere herein.

For instance, the method may include determining, by one or more processors, one or more keywords and phrases associated with the identified industry trend of interest; and performing the associative discovery process by using text mining may include analyzing the one or more enterprise documents in the enterprise dataset with respect to the one or more keywords and phrases to determine a set of documents that lead to the generation of the potential intellectual property. The method may include assigning, by one or more processors, a weight to (i) each document, (ii) certain keywords and phrases, or (iii) a combination thereof in the set of documents; performing, by one or more processors, a normalization on the weighted set of documents; selecting, by one or more processors, a subset of documents from the normalized weighted set of documents; and/or ranking, by one or more processors, the subset of documents based upon the normalized weight.

The method may also include evaluating, by one or more processors, contents of each document in the subset of documents according to a ranking order to determine how relevant each document is to the identified industry trend of interest; generating, by one or more processors, a feedback score for each document in the subset of documents, the feedback score indicating the relevance of each document to the identified industry trend of interest; determining, by one or more processors, an optimal weighing scheme based upon the feedback score for each document in the subset of documents; and/or assigning, by one or more processors, a rank for each document in the set of documents by using the optimal weighing scheme. The rank may indicate the likelihood that a given document in the set of documents may lead to the generation of the potential intellectual property. The method may generate the feedback score based on identified words and phrases associated with business decisions made by the business entity.

The one or more enterprise documents may describe one or more of an enterprise business process, an enterprise application, and/or an enterprise project that is being generated or explored by the business entity. The one or more industry trends may describe one or more of a new business process or a new technology that may be relevant to the field in which the business entity operates. Performing the associative discovery process by using text mining may further include performing one or more of an entity extraction, a keyword extraction, a word matching, a spell check and correction, a word clustering, a taxonomy including organizing groupings of words, phrases and concepts used to extract meaning from text, or a context searching.

IX. Exemplary Computer System

In one aspect, a computer system for electronically mining intellectual property may be provided. The computer system may include one or more dataset repositories and an analysis server, including a memory having instructions for execution on one or more processors. The instructions, when executed by the one or more processors, may cause the analysis server to: retrieve an enterprise dataset from the one or more dataset repositories, the enterprise dataset including one or more enterprise documents from a business entity; retrieve up to one or more industry datasets from the one or more dataset repositories, the up to one or more industry datasets including one or more technology trends that are relevant to the field in which the business entity operates; identify an industry trend of interest from the up to one or more industry datasets; perform an associative discovery process by using text mining to analyze the one or more enterprise documents in the enterprise dataset and the identified industry trend of interest in order to determine correlations that may lead to the generation of a potential intellectual property; and/or provide (and/or present) results of the associative discovery process to a user. The computer system may include additional, less, or alternate components, including those discussed elsewhere herein.

For instance, the instructions of the analysis server, when executed by the one or more processors, may cause the analysis server to: determine one or more keywords and phrases associated with the identified industry trend of interest; and perform the associative discovery process by using text mining to analyze the one or more enterprise documents in the enterprise dataset with respect to the one or more keywords and phrases to determine a set of documents that lead to the generation of the potential intellectual property.

The instructions of the analysis server, when executed by the one or more processors, may cause the analysis server to: assign a weight to (i) each document, (ii) certain keywords and phrases, or (iii) a combination thereof in the set of documents; perform a normalization on the weighted set of documents; select a subset of documents from the normalized weighted set of documents; and/or rank the subset of documents based on the normalized weight. The instructions of the analysis server, when executed by the one or more processors, may cause the analysis server to: evaluate contents of each document in the subset of documents according to ranking order to determine how relevant each document is to the identified industry trend of interest; generate a feedback score for each document in the subset of documents, the feedback score indicating the relevance of each document to the identified industry trend of interest; determine an optimal weighing scheme based on the feedback score for each document in the subset of documents; and/or assign a rank to each document in the set of documents by using the optimal weighing scheme, the rank indicating the likelihood that a given document in the set of documents can lead to the generation of the potential intellectual property.

The one or more enterprise documents may describe one or more of an enterprise business process, an enterprise application, or an enterprise project that is being generated or explored by the business entity. The one or more industry trends may describe one or more of a new business process or a new technology that is relevant to the field in which the business entity operates. The instructions of the analysis server when executed by the one or more processors to perform the associative discovery process by using text mining may further include performing one or more of an entity extraction, a keyword extraction, a word matching, a spell check and correction, a word clustering, a taxonomy including organizing groupings of words, phrases and concepts used to extract meaning from text, or a context searching.

X. Exemplary Non-Transitory Storage Medium

In one aspect, a non-transitory computer-readable storage memory including computer-readable instructions may be executed on one or more processors of a system for electronically mining intellectual property. The instructions, when executed, may cause the one or more processors to: receive an enterprise dataset, the enterprise dataset including one or more enterprise documents from a business entity; receive up to one or more industry datasets, the up to one or more industry datasets including one or more technology trends that are relevant to the field in which the business entity operates; identify an industry trend of interest from the up to one or more industry datasets; perform an associative discovery process by using text mining to analyze the one or more enterprise documents in the enterprise dataset and the identified industry trend of interest in order to determine correlations that can lead to the generation of a potential intellectual property; and/or provide results of the associative discovery process to a user.

The instructions, when executed, may cause the one or more processors to: determine one or more keywords and phrases associated with the identified industry trend of interest; and perform the associative discovery process by using text mining to analyze the one or more enterprise documents in the enterprise dataset with respect to the one or more keywords and phrases to determine a set of documents that lead to the generation of the potential intellectual property. Additionally, the instructions, when executed, may cause the one or more processors to: assign a weight to (i) each document, (ii) certain keywords and phrases, or (iii) a combination thereof in the set of documents; perform a normalization on the weighted set of documents; select a subset of documents from the normalized weighted set of documents; and rank the subset of documents based on the normalized weight.

The instructions, when executed, may cause the one or more processors to: evaluate contents of each document in the subset of documents according to ranking order to determine how relevant each document is to the identified industry trend of interest; generate a feedback score for each document in the subset of documents, the feedback score indicating the relevance of each document to the identified industry trend of interest; determine an optimal weighing scheme based on the feedback score for each document in the subset of documents; and assign a rank to each document in the set of documents by using the optimal weighing scheme, the rank indicating the likelihood that a given document in the set of documents can lead to the generation of the potential intellectual property.

The instructions may cause a processor to determine the optimal weighing scheme using a statistical learning model to calculate an optimal weight for each of the keywords and phrases using the feedback score as a target. The instructions may direct or control additional, less, or alternate functionality, including that discussed elsewhere herein.

XI. Additional Exemplary Methods

In one aspect, a computer-implemented method of searching a database for items of interest may be provided. The method may include (1) identifying an area of interest, either electronically or manually; (2) identifying, via a processor, a key word or key words associated with the area of interest; (3) electronically searching a database of documents, via the processor, for documents containing the key word or key words associated with the area of interest; (4) ranking the documents, via the processor, in accordance with their respective relevance or importance with respect to the area of interest, a relevance or importance of each document being determined based upon the key word or key words, and/or an amount of times that the key word or key words appear in each document; (5) analyzing an effectiveness or impact of each key word on identifying documents pertinent to the area of interest, via the processor; and/or (6) providing feedback, such as on a display, as to the effectiveness or impact of each key word in searching for and/or identifying documents associated with the area of interest.

The method may also include electronically identifying linking terms. The linking terms may include a number of keywords, for example comprise a key phrase. Additionally or alternatively, the linking terms may link or be associated with a relationship between two or more keywords. The keywords and/or linking terms within a document may be electronically analyzed by a processor, and the processor may create a visual representation indicating the relevance of the document to an area of interest search for. The method may include additional, fewer, or alternative actions, including those discussed elsewhere herein.

In another aspect, a computer-implemented method of searching a database for items of interest may be provided. The method may include: (1) data mining or searching a database, via a processor, to identify an area of interest, the area of interest being an industry trend or opportunity, or a technology trend; (2) analyzing sample documents associated with the area of interest, via the processor, to identify one or more identifiers for the area of the interest, the identifiers including keywords and/or keyword linking terms (and/or linking terms that may link or be associated with more than one keywords); (3) searching a database of documents unrelated to the sample documents, via the processor, for the one or more identifiers; (4) identifying documents in the database, via the processor, containing the one or more identifiers; (5) ranking the documents containing the one or more identifiers, via the processor, according to estimated importance or relevance to the area of interest; and/or (6) presenting or identifying documents containing the one or more identifiers that are estimated to be of more importance or relevance to the area of interest than other documents containing the one or more identifiers to facilitate automatically (or even manual) identification of documents that may provide a business advantage or contain intellectual property.

XII. Exemplary Computing Environment

Figure 5:
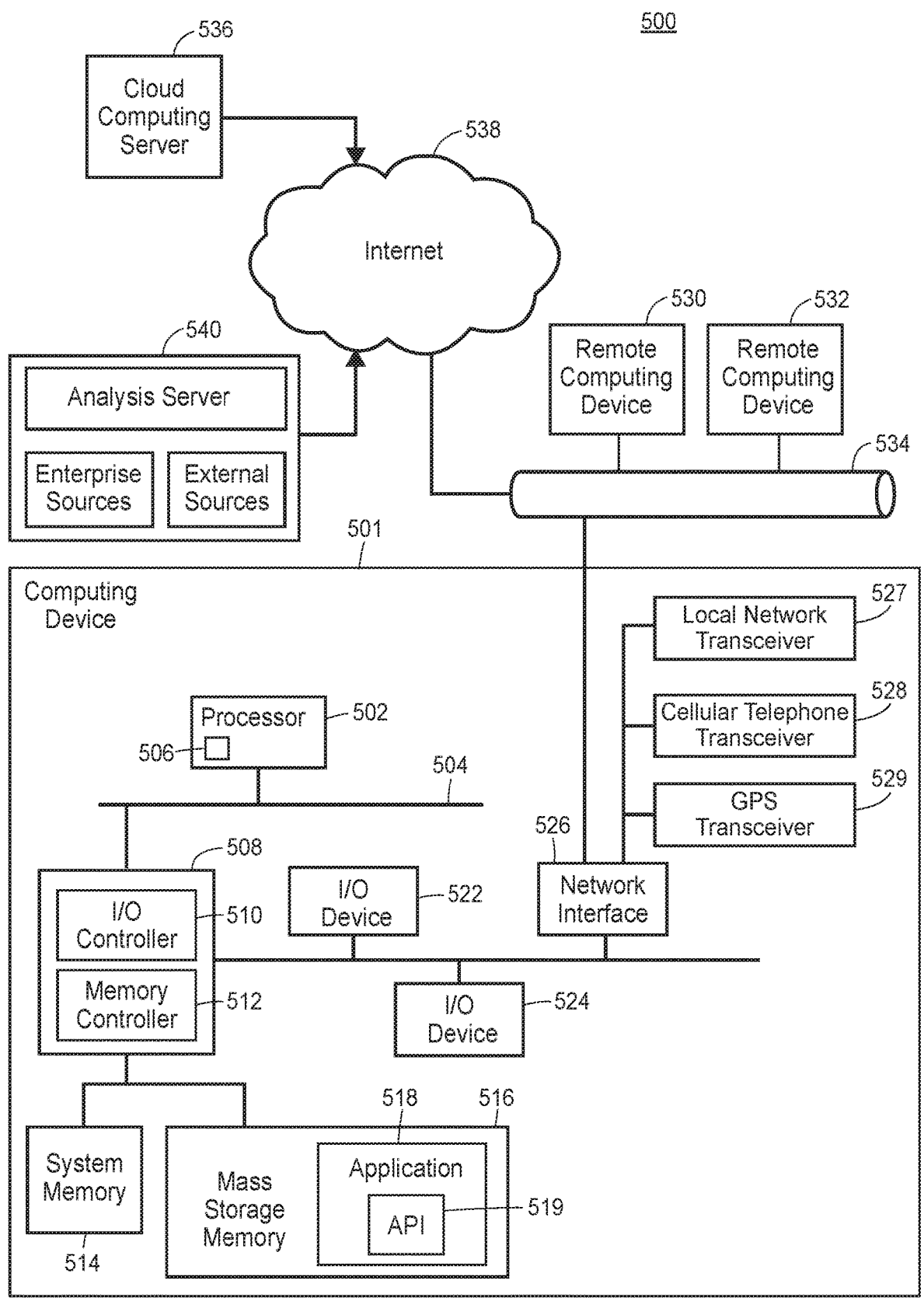
FIG. 5 is a block diagram of an exemplary computing environment that implements a system and method for electronically mining intellectual property for enterprise business needs.

FIG. 5 is a block diagram of an exemplary computing environment for a system 500 having a computing device 501 that may be used to implement the systems and methods described herein. The computing device 501 may include one or more devices 102, a server 104, a mobile computing device (e.g., cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices may be used that have different architectures. Processor systems similar or identical to the system 500 may be used to implement and execute the exemplary system of FIG. 1, the process of FIG. 2, the methods of FIG. 3 and FIG. 4, and the like. Although the system 500 is described below as including a plurality of peripherals, interfaces, chips, memories, etc., one or more of those elements may be omitted from other exemplary processor systems used to implement and execute the exemplary system 100. Also, other components may be added.

As shown in FIG. 5, the computing device 501 may include a processor 502 that is coupled to an interconnection bus 504. The processor 502 may include a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which may include a memory controller 510 and a peripheral input/output (I/O) controller 512. As is well known, a chipset typically provides I/O and memory management functions as well as a plurality of general purpose and/or special purpose registers, timers, etc. that are accessible or used by one or more processors coupled to the chipset 508. The memory controller 510 performs functions that enable the processor 502 (or processors if there are multiple processors) to access a system memory 514 and a mass storage memory 516, that may include either or both of an in-memory cache (e.g., a cache within the memory 514) or an on-disk cache (e.g., a cache within the mass storage memory 516).

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement an application 518 having an API 519 (including functions and instructions as described by the methods 300 and 400 of FIG. 3 and FIG. 4, respectively). The mass storage memory 516 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 501 and the system 500. Thus, a module, block, function, operation, procedure, routine, step, and method may be implemented in hardware, firmware, and/or software. In one embodiment, program modules and routines (e.g., the application 518, the API 519, etc.) are stored in mass storage memory 516, loaded into system memory 514, and executed by a processor 502 or may be provided from computer program products that are stored in tangible computer-readable storage mediums (e.g., RAM, hard disk, optical/magnetic media, etc.).

The peripheral I/O controller 510 may perform functions that enable the processor 502 to communicate with peripheral input/output (I/O) devices 522 and 524, a network interface 526, a local network transceiver 527, a cellular network transceiver 528, and a GPS transceiver 529 via the network interface 526. The I/O devices 522 and 524 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The cellular telephone transceiver 528 may be resident with the local network transceiver 527. The local network transceiver 527 may include support for a Wi-Fi network, Bluetooth, Infrared, or other wireless data transmission protocols. In other embodiments, one element may simultaneously support each of the various wireless protocols employed by the computing device 501. For example, a software-defined radio may be able to support multiple protocols via downloadable instructions. In operation, the computing device 501 may be able to periodically poll for visible wireless network transmitters (both cellular and local network) on a periodic basis. Such polling may be possible even while normal wireless traffic is being supported on the computing device 501. The network interface 526 may be, for example, an Ethernet device, an asynchronous transfer mode (ATM) device, an 802.11 wireless interface device, a DSL modem, a cable modem, a cellular modem, etc., that enables the system 500 to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits. The system 500 may also implement the application 518 on remote computing devices 530 and 532. The remote computing devices 530 and 532 may communicate with the computing device 501 over an Ethernet link 534. In some embodiments, the application 518 may be retrieved by the computing device 501 from a cloud computing server 536 via the Internet 538. When using the cloud computing server 536, the retrieved application 518 may be programmatically linked with the computing device 501. The application 518 may be a Java® applet executing within a Java® Virtual Machine (JVM) environment resident in the computing device 501 or the remote computing devices 530, 532. The application 518 may also be "plug-ins" adapted to execute in a web-browser located on the computing devices 501, 530, and 532. In some embodiments, the application 518 may communicate with backend components 540 such as the analysis server 104, the enterprise sources 114 and the external sources 122 via the Internet 538.

The system 500 may include but is not limited to any combination of a LAN, a MAN, a WAN, a mobile, a wired or wireless network, a private network, or a virtual private network. Moreover, while only two remote computing devices 530 and 532 are illustrated in FIG. 5 to simplify and clarify the description, it is understood that any number of client computers are supported and may be in communication within the system 500.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the Figures depict preferred embodiments of a system and method for electronically mining intellectual property for enterprise business for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for electronically mining intellectual property for enterprise business needs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for electronically mining intellectual property using an associative discovery process, the method comprising:
   determining, by one or more processors analyzing enterprise documents in an enterprise dataset associated with a business entity, a set of documents containing one or more keywords and/or phrases associated with an industry trend of interest;
   determining, by one or more processors, a feedback score for each document in the set of documents, wherein the feedback score for a given document indicates relevance of the given document to the industry trend of interest;
   determining, by one or more processors, an optimal weighing scheme for the one or more keywords and/or phrases using a statistical learning model and the feedback scores for the set of documents, wherein determining an optimal weighing scheme includes calculating an optimal weight for each of the one or more keywords and/or phrases;
   ranking, by one or more processors, a plurality of documents according to the optimal weighing scheme, such that the ranking indicates how strongly each document in the plurality cot of documents is related to the industry trend of interest; and
   providing, by one or more processors, results of the associative discovery process to a user.

2. The computer-implemented method of claim 1, further comprising:
   for each document in the set of documents, assigning, by one or more processors, a weight, wherein a greater weight is assigned for documents in which the one or more keywords and/or phrases appear more frequently.

3. The computer-implemented method of claim 1, wherein the one or more enterprise documents describe one or more of an enterprise business process, an enterprise application, or an enterprise project that is being generated or explored by the business entity.

4. The computer-implemented method of claim 1, wherein the industry trend of interest describes one or more of a new business process, or a new technology, that is relevant to a field in which the business entity operates.

5. The computer-implemented method of claim 1, wherein the feedback score is a score generated based on words and/or phrases associated with business decisions made by the business entity.

6. The computer-implemented method of claim 1, further comprising, prior to determining the set of documents:
   receiving one or more industry datasets specifying one or more technology trends that are relevant to a field in which the business entity operates; and
   identifying, by one or more processors, the industry trend of interest from the one or more industry datasets.

7. The computer-implemented method of claim 1, further comprising:
   prior to determining the set of documents, determining, by one or more processors analyzing one or more industry datasets specifying one or more technology trends that are relevant to a field in which the business entity operates, the one or more keywords and/or phrases.

8. A non-transitory computer-readable storage memory including computer-readable instructions to be executed on one or more processors of a system for electronically mining intellectual property using an associative discovery process, the instructions when executed causing the one or more processors to:
   determine, by analyzing enterprise documents in an enterprise dataset associated with a business entity, a set of documents containing one or more keywords and/or phrases associated with an industry trend of interest;
   determine a feedback score for each document in the set of documents, wherein the feedback score for a given document indicates relevance of the given document to the industry trend of interest;
   determine an optimal weighing scheme for the one or more keywords and/or phrases using a statistical learning model and the feedback scores for the set of documents, wherein determining an optimal weighing scheme includes calculating an optimal weight for each of the one or more keywords and/or phrases;
   rank a plurality of documents according to the optimal weighing scheme, such that the ranking indicates how strongly each document in the cot plurality of documents is related to the industry trend of interest; and
   provide results of the associative discovery process to a user.

9. The non-transitory computer-readable storage memory of claim 8, wherein:
   the instructions further cause the one or more processors to, for each document in the set of documents, assign a weight, wherein a greater weight is assigned for documents in which the one or more keywords and/or phrases appear more frequently.

10. The non-transitory computer-readable storage memory of claim 8, wherein the one or more enterprise documents describe one or more of an enterprise business process, an enterprise application, or an enterprise project that is being generated or explored by the business entity.

11. The non-transitory computer-readable storage memory of claim 8, wherein the industry trend of interest describes one or more of a new business process, or a new technology, that is relevant to a field in which the business entity operates.

12. The non-transitory computer-readable storage memory of claim 8, wherein the feedback score is a score generated based on words and/or phrases associated with business decisions made by the business entity.

13. The non-transitory computer-readable storage memory of claim 8, wherein the instructions further cause the one or more processors to, prior to determining the set of documents:
   receive one or more industry datasets specifying one or more technology trends that are relevant to a field in which the business entity operates; and
   identify the industry trend of interest from the one or more industry datasets.

14. The non-transitory computer-readable storage memory of claim 8, wherein the instructions further cause the one or more processors to:
   prior to determining the set of documents, determine, by analyzing one or more industry datasets specifying one or more technology trends that are relevant to a field in which the business entity operates, the one or more keywords and/or phrases.

15. A computer system for electronically mining intellectual property using an associative discovery process, the system comprising:
   one or more dataset repositories; and
   an analysis server, including a memory having instructions for execution on one or more processors, wherein the instructions, when executed by the one or more processors, cause the analysis server to determine, by analyzing enterprise documents in an enterprise dataset associated with a business entity, a set of documents containing one or more keywords and/or phrases associated with an industry trend of interest, determine a feedback score for each document in the set of documents, wherein the feedback score for a given document indicates relevance of the given document to the industry trend of interest, determine an optimal weighing scheme for the one or more keywords and/or phrases using a statistical learning model and the feedback scores for the set of documents, wherein determining an optimal weighing scheme includes calculating an optimal weight for each of the one or more keywords and/or phrases, rank a plurality of documents according to the optimal weighing scheme, such that the ranking indicates how strongly each document in the plurality of documents is related to the industry trend of interest, and provide results of the associative discovery process to a user.

16. The computer system of claim 15, wherein:

the instructions further cause the analysis server to, for each document in the set of documents, assign a weight, wherein a greater weight is assigned for documents in which the one or more keywords and/or phrases appear more frequently.

17. The computer system of claim 15, wherein the one or more enterprise documents describe one or more of an enterprise business process, an enterprise application, or an enterprise project that is being generated or explored by the business entity.

18. The computer system of claim 15, wherein the feedback score is a score generated based on words and/or phrases associated with business decisions made by the business entity.

19. The computer system of claim 15, wherein the instructions further cause the analysis server to, prior to determining the set of documents:

receive one or more industry datasets specifying one or more technology trends that are relevant to a field in which the business entity operates; and identify the industry trend of interest from the one or more industry datasets.

20. The computer system of claim 15, wherein the instructions further cause the analysis server to:

prior to determining the set of documents, determine, by analyzing one or more industry datasets specifying one or more technology trends that are relevant to a field in which the business entity operates, the one or more keywords and/or phrases.

* * * * *